(No Model.) 2 Sheets—Sheet 1.

G. H. CHAPPELL.
APPARATUS FOR INDICATING RACES.

No. 432,694. Patented July 22, 1890.

WITNESSES:
J. C. Decker
William Goebel.

INVENTOR
George H. Chappell
BY
T. F. Bourne
his ATTORNEY.

(No Model.) 2 Sheets—Sheet 2.

G. H. CHAPPELL.
APPARATUS FOR INDICATING RACES.

No. 432,694. Patented July 22, 1890.

WITNESSES:
J. C. Decker
William Goebel

INVENTOR
George H. Chappell
BY T. F. Bourne
his ATTORNEY.

UNITED STATES PATENT OFFICE.

GEORGE HENRY CHAPPELL, OF NEW YORK, N. Y., ASSIGNOR OF ONE-HALF TO FRANCISCO LAVANDEYRA, OF SAME PLACE.

APPARATUS FOR INDICATING RACES.

SPECIFICATION forming part of Letters Patent No. 432,694, dated July 22, 1890.

Application filed January 6, 1890. Serial No. 336,041. (No model.)

*To all whom it may concern:*

Be it known that I, GEORGE HENRY CHAPPELL, a citizen of the United States, and a resident of New York city, in the county of New York and State of New York, have invented an Improved Apparatus for Indicating Races and Games, of which the following is a specification.

My invention has for its object to indicate or represent at a distance on a miniature scale or track the progress of a horse race or other game taking place on a field or track at any point.

The invention consists in an apparatus comprising indicating-figures, a motor for continuously moving them, and a magnet for changing the position of one figure relatively to the other. One of such apparatuses is preferably placed near the race-track or field of other game and other similar apparatuses are placed at other desired points—say in suitable places in distant cities—and connected to the apparatus at the race-track by suitable electrical wires or conductors or otherwise. The first-mentioned apparatus has connected to it suitable keys or make-and-break contacts, by means of which and the electric current it and the apparatuses at a distance can be controlled. The miniature horses or figures on the several apparatuses are numbered or lettered to correspond with the horses participating in the race, and during the progress of the race as one horse forges ahead or drops behind the operator of the apparatus situated at the scene of action, by pressing on a corresponding key, can cause the figures on all the apparatuses corresponding to said horses or to any horse or figure to forge ahead or drop behind to follow the movements and positions of the contestants. By this means the operation or progress of a horse-race or other game can be portrayed or indicated on miniature tracks at a distance from the race-track and simultaneously with the progress of a race.

The invention also consists in the novel details of improvement and the combinations of parts that will be more fully hereinafter set forth, and then pointed out in the claims.

Reference is to be had to the accompanying drawings, forming part of this specification, wherein—

Figure 1:
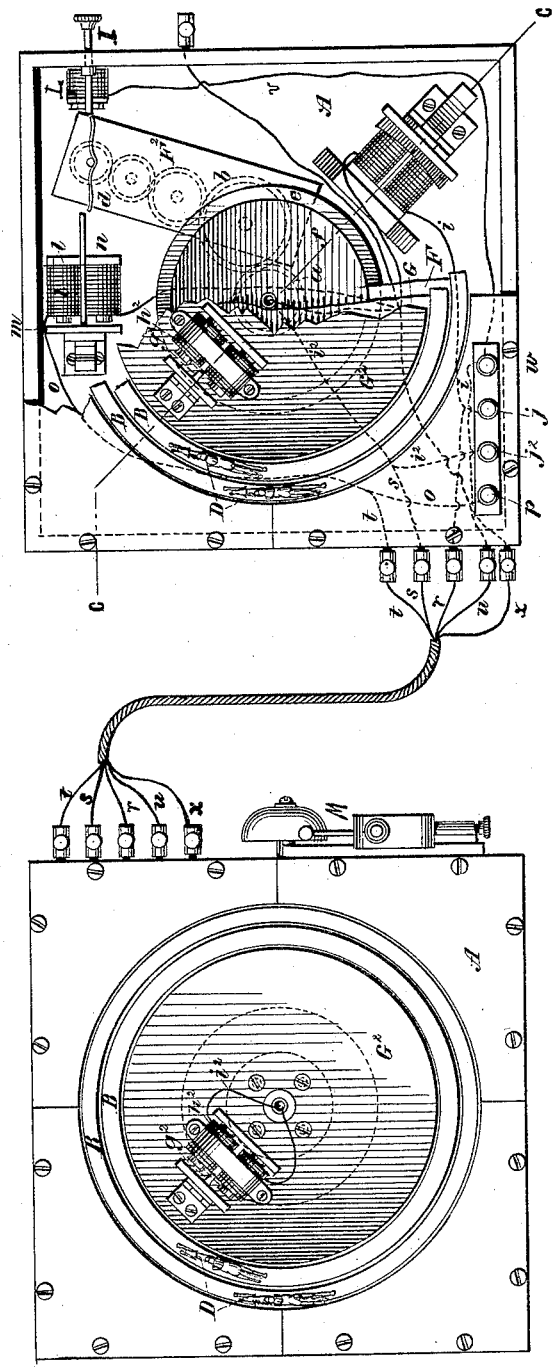
Figure 2:
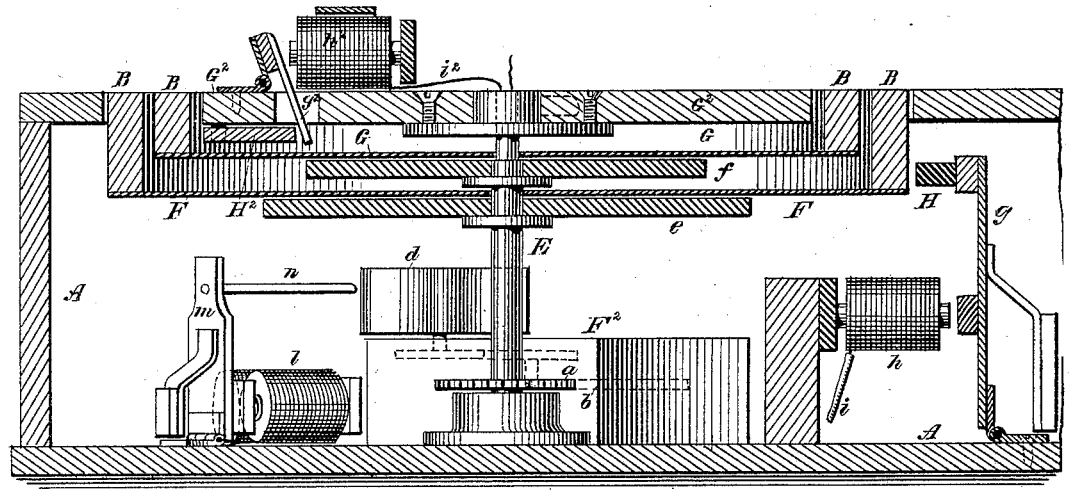
Figure 3:
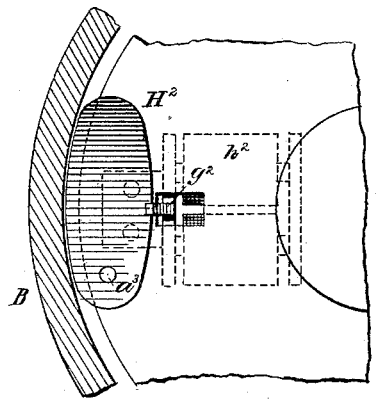
Figure 4:
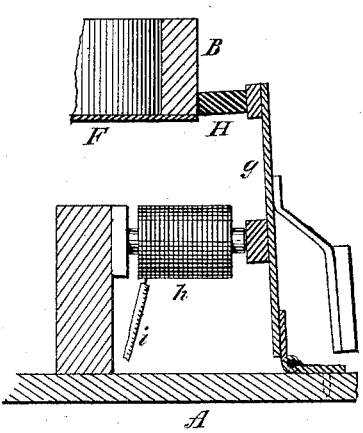
Figure 5:
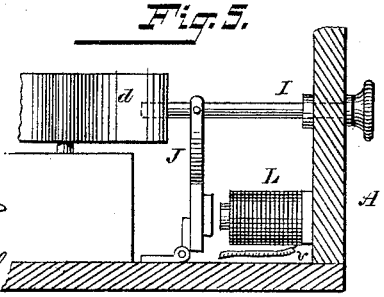

Figure 1 is a plan view of two apparatuses embodying this invention and connected together in circuit, one of such apparatuses being partly broken away. Fig. 2 is a vertical cross-section, enlarged, on the plane of the line *c c*, Fig. 1. Figs. 3 and 4 are sectional detail views of the brakes applied, and Fig. 5 is a detail view of means for holding the gearing in check.

Referring now to the accompanying drawings, the letter A indicates a suitable box or casing, within which I prefer to inclose the mechanism of my apparatus.

B B indicate moving supports adapted to carry miniature horses or other figures D, which supports B in the drawings are represented in the form of circular tracks intended to indicate a race-track. Said supports or tracks B may be driven in any suitable direction, being turned in a circular direction in the example shown, and they are preferably actuated independently of each other, so that one can move while the other is stationary. They may be driven by a clock-work, electric motor, or any other desired motive power.

The means I have shown for driving the supports or tracks B may be described as follows: E is a rotary spindle guided to turn on its longitudinal axis and suitably supported within the casing A. Said spindle carries a gear-wheel $a$, that meshes with a similar wheel $b$ of a train of gearing or clock-work $F^2$. Said train of gearing or clock-work may be driven by a spring or weight in manner well known, or the spindle E may be driven by an electric motor or by any other desired motive power. The train of gearing $F^2$ is provided with a fan or other regulator $d$ to regulate the speed of the spindle E, and thereby the speed of the figures D. The spindle E carries a friction disk or projection $e$, upon which a plate or arm F rests, which latter carries a support or track B, as shown. As the friction disk or projection $e$ rotates, it will carry the plate or arm F with it, thereby turning the support or track B. $f$ is another friction disk or projection, which is suitably connected with the spindle E—say by slipping it over said spindle and securing it in any desired manner, so that it will turn with said spindle—and G is another plate or arm like F, carrying the other support or track B, as shown. The friction disk or projection $f$ turns the plate or arm G in manner described with reference to plate F.

By the above means both the supports or tracks B B can be turned in unison or separately.

It will be understood that the supports or tracks B and their supporting and moving connections can be multiplied indefinitely, whereby as many figures D as desired may be used and actuated; also, that the connections between the figures D and the motor can be altered as desired.

In order to stop or retard one or more of the figures D when desired, I provide brakes H H$^2$ or other desired means—say one for each support or track B—which brakes, when pressed against the supports or tracks B, will stop them or retard their movement. Said brakes H H$^2$ may be carried and actuated in any desired manner. I have shown them connected with the armatures $g$ $g^2$ of suitable electro-magnets $h$ $h^2$. When the current passes through said magnets, their armatures will be attracted, and thus the brakes will be moved to stop the supports or tracks B. The magnet $h^2$ and its armature $g^2$ are shown supported by the cover G$^2$ of the casing A, and the brake H$^2$ in Fig. 3 is shown pivoted at $a^3$ to the cover G$^2$, so that the armature $g^2$ may actuate it. The magnet $h$ and armature $g$ are shown suitably supported within the casing A. Each magnet $h$ $h^2$ is connected by a wire or conductor $i$ $i^2$ with a suitable key, button, or make-and-break contact $j$ $j^2$, each one corresponding to a magnet $h$ or $h^2$. When said buttons are pressed, the magnets will be actuated.

In order to stop the several trains of gearing or clock-work F$^2$ at any time, so that all the horses or figures D will be arrested simultaneously, I provide an electro-magnet $l$, whose armature $m$ carries or is connected with a finger or projection $n$, that is adapted to engage the fan or regulator $d$ or other part of the train which prevents movement of said fan when in engagement therewith.

The magnet $l$ is connected by a wire $o$ with a button or the like $p$, by means of which the action of the magnet and finger $n$ can be regulated. The several fans $d$ or the trains of gearing are normally held in check by a rod I, shown guided in the casing A, which rod is shown connected with the armature J of a magnet L. A wire or conductor $v$ extends from the magnet L to a button or the like $w$ for closing the circuit. When said button is pressed, the armature J will be moved, thereby withdrawing the rod I from the fan $d$ and permitting the train of gearing to run.

Of course it will be understood that the several magnets are to be connected with suitable batteries or other electrical generators in manner well known.

Having now described the details of construction of the mechanism contained in one casing A, I would state that substantially the same mechanism can be contained in the other apparatuses used in connection.

The several buttons or the like $j$, $j^2$, $p$, and $w$ of the apparatus A$^2$ are to be also connected by wires or conductors $r$, $s$, $t$, $u$, and $x$ with corresponding magnets $h$ $h^2$ $l$ L in the other casings, so that no matter how many apparatuses are connected with the apparatus A$^2$ all the parts will act simultaneously when the different buttons are pushed and the different trains of gearing permitted to run or stopped.

Having now described one means for carrying out my invention, I will show how the several apparatuses are operated to indicate the progress of a race or other game.

One apparatus A$^2$ is placed at a convenient point at a race-course and connected by wires $r$ $s$ $t$ $u$ $x$ with one or more substantially similar apparatuses at distant points—say in hotels or the like—the several trains of gearing being held in check by the several rods I. The operator then preferably adjusts suitable field or other glasses to his eyes to enable him to clearly distinguish the several competing horses or other competitors. As soon as he ascertains the names of the horses to contest in the race he telegraphs to the attendants at the several apparatuses in connection such names or suitable numbers or marks, and he and said attendants then place numbers or names on the figures D to correspond with the contesting horses. When the horses are about ready to start, he presses the button $w$, which causes the magnet L to draw the rods I from the fans $d$, whereby the several trains of gearing will be released and ready to start. He then presses the button $p$, which causes the fingers $n$ to engage with the fans $d$ to hold the train of gearing in check. At the same time an electric bell M, in circuit with the armature M', signals to the several attendants that the race is about to start, who immediately place all the figures D in their proper positions. When the race starts, the operator of apparatus A$^2$ at the race-track releases the button $p$, whereby the fingers $n$ will be withdrawn from the several fans $d$. The trains of gearing now being released, the several spindles E in the several apparatuses will be turned slowly or at the desired speed, all the figures moving in unison. Suppose, now, the horse corresponding to figure 1 forges ahead. The operator immediately presses the button or buttons controlling the other figures, which causes the brakes for said figures to be moved to stop or retard said figures, while the clock-work and figure 1 keep on moving, whereby said figure will appear to advance ahead of the other figures D. When this is done, said buttons are then released, thereby permitting all or any of the horses or figures D to again move, but in the altered positions, as the case may be, and so on during the progress of the race, as one horse forges ahead or drops behind, the operator presses the proper buttons or keys to cause certain figures to advance ahead of the others or to drop behind in manner before stated. When the race is finished, the operator releases the button $w$, which causes the rod I to move to stop the fans and thereby the trains of gearing and figures D, and by pressing on the button $p$ the bell M will signal that the race is finished. Thus a fac-simile of a race is produced at different points, and as soon as a race is finished persons can ascertain the winning horse by merely looking at the apparatus, and can also see the positions of the several horses substantially the same and at about the same time as if they were present at the race-track; also, during the progress of the race persons can ascertain the positions of the several horses in the race. As the operator at the race-track has one apparatus in plain sight, he can see at a glance if the figures D are in the proper positions corresponding to the positions of the participating horses or other contestants. As often happens, horses or other contestants have to be called back after starting for different reasons, and then start again. By providing suitable means—such as cords or weights, springs, trains of gearing, electro-magnets, conductors, &c.—the figures D, after starting, can be brought back to the starting-point ready to start again by the operator by merely pressing a suitable button in circuit.

Apparatuses operated as above will be of great interest to persons desirous of watching the progress of a race or of ascertaining the names of the winners &c., as soon as the race is finished.

Of course the mechanism for operating the several figures can be altered from that shown and described without departing from the spirit of my invention—as, for instance, instead of the figures traveling in a circle, they can be made to travel in an ellipse or a straight line, or in other desired directions. A suitable starting-post can be placed in position, and posts or points indicating the fractions of a mile can be placed near the line of movement of the course, so that the exact position of the contesting horses can be ascertained and portrayed.

It is evident that the mechanism can be so adjusted or altered that any other race—such as boat-races or any other suitable game desired—can be indicated or portrayed substantially in the manner before specified.

Of course I do not wish to confine myself to the use of the electric current for stopping or retarding and starting the several figures; but I prefer to use the same for obvious reasons.

By making the supports B B in the form of circular tracks they present the appearance of race-tracks at all times, although they may happen to be moving when seen.

Having now described my invention, what I claim is—

1. An apparatus for indicating or portraying the progress of a race or game, comprising miniature horses or other indicating-figures, a motor continuously actuating them simultaneously and moving them all in the same direction, and a magnet for each of said figures for stopping or retarding the movement of said figures independently or together, substantially as described.

2. In an apparatus for indicating or portraying the progress of a race or game, miniature horses or indicating-figures, and a motor continuously actuating them simultaneously and all in the same direction, and a magnet for changing the position of one figure relatively to the other, in combination with a similar apparatus at a suitable distance from said first-mentioned apparatus and with wires or conductors connecting the actuating devices of one apparatus with the corresponding devices in the other apparatus, whereby the corresponding devices in both said apparatuses will be actuated simultaneously and in unison, substantially as specified.

3. In an apparatus for indicating or portraying the progress of a race or game, the combination of one or more indicating-figures, a motor continuously actuating the same, a magnet for stopping and releasing said motor, and a magnet for stopping or retarding the movement of any figure D, substantially as specified.

4. In an apparatus for indicating the progress of a race or game, a figure D and a motor for actuating the same, combined with a brake for stopping or retarding said figure independently of and without stopping the motor, and an electro-magnet and connections for actuating said brake, substantially as described.

5. In an apparatus for indicating the progress of a race or game, a figure D, a motor for actuating the same, and a magnet for stopping said figure independently of the motor, in combination with a stop for stopping said motor and a magnet and connections for actuating said stop to stop or release said motor, substantially as described.

6. A figure D, a motor for actuating the same, a brake for stopping or retarding said figure, and a magnet and connections for actuating said brake, combined with a stop for stopping the motor and a magnet and connections for actuating said stop to stop or release the motor, substantially as described.

7. The figure D, support B, projection F, friction-arm $e$, and a motor for actuating the same, combined with a magnet for stopping or retarding the figure D, substantially as described.

8. The figure D, support B, projection F, friction-arm $e$, and a motor for actuating the same, combined with a stop for stopping and holding in check the motor and a magnet and connections for actuating said stop, substantially as described.

9. The figure D, support B, projection F, friction-arm $e$, and a motor for actuating the same, combined with a magnet for stopping or retarding the figure D and a separate magnet for stopping or holding in check the motor, substantially as described.

10. The combination of the figures D, supports B, projections F G, friction-arms $e$ $f$, a motor for actuating them, and a magnet for each support B, for stopping or retarding each of said supports independently, substantially as specified.

11. The support B and means, substantially as described, for actuating the same, combined with the brake $H^2$, pivoted, as at $a^3$, and adapted to bear upon the support B, armature $g^2$, adapted to actuate the brake $H^2$, magnet $h^2$, and connections, substantially as described.

12. The support B, projection F, arm $e$, spindle E, carrying the same, gear-wheel $a$ on said spindle, and a train of gearing or motor having a wheel $b$ meshing with the wheel $a$, and a fan or regulator $d$, combined with a stop for stopping said train of gearing or motor and a magnet and connections for actuating said rod, substantially as described.

13. The support B, projection F, arm $e$, spindle E, carrying the same, gear-wheel $a$ on said spindle, and a train of gearing or motor having a wheel $b$ meshing with the wheel $a$, combined with a brake H, armature $g$, for actuating the same, and a magnet and connections for actuating said armature, substantially as described.

14. In an apparatus for indicating or portraying the progress of a race or game, indicating-figures and a motor for continuously moving them, combined with a magnet for changing the position of one figure relatively to the other, substantially as described.

15. The support B and a motor for actuating the same, combined with the brake H to engage said support to stop or retard it, armature $g$, connected to the same, magnet $h$, to actuate said brake, and connections for said magnet, substantially as described.

Signed at New York, in the county of New York and State of New York, this 4th day of January, A. D. 1890.

GEORGE HENRY CHAPPELL.

Witnesses:
  E. B. WILSON,
  T. F. BOURNE.